W. F. SELLERS.
METALLIC BAFFLE PLATE.
APPLICATION FILED OCT. 11, 1918.
1,351,797.
Patented Sept. 7, 1920.
2 SHEETS—SHEET 2.
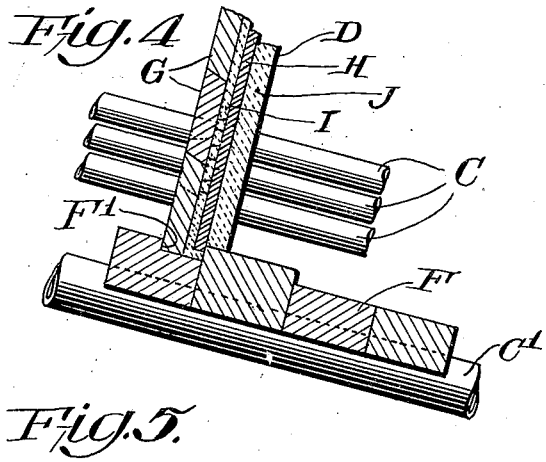
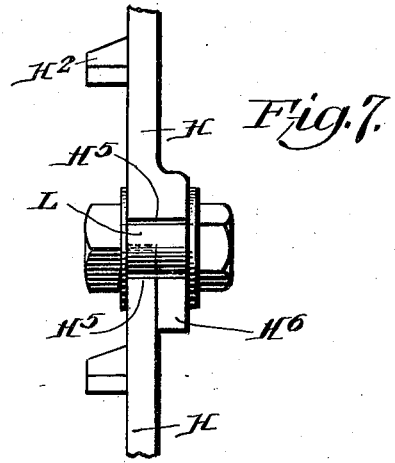
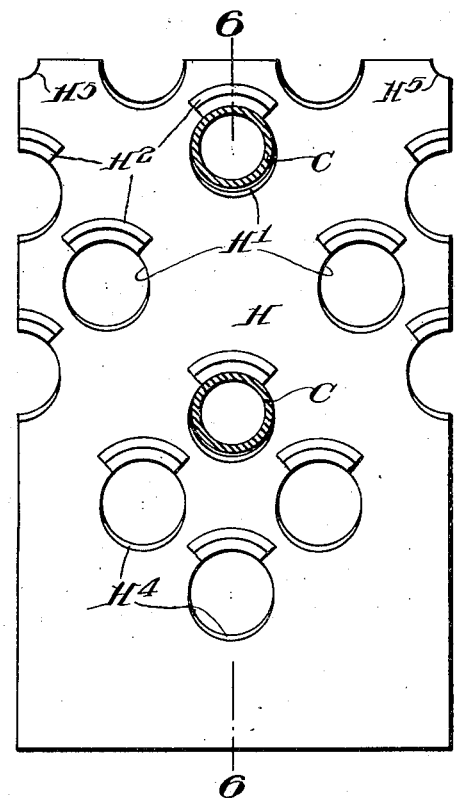
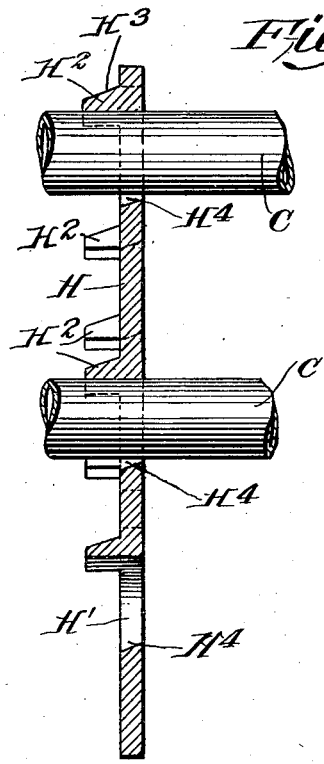
Inventor
William F. Sellers
By Francis D. Chambers
his Attorney

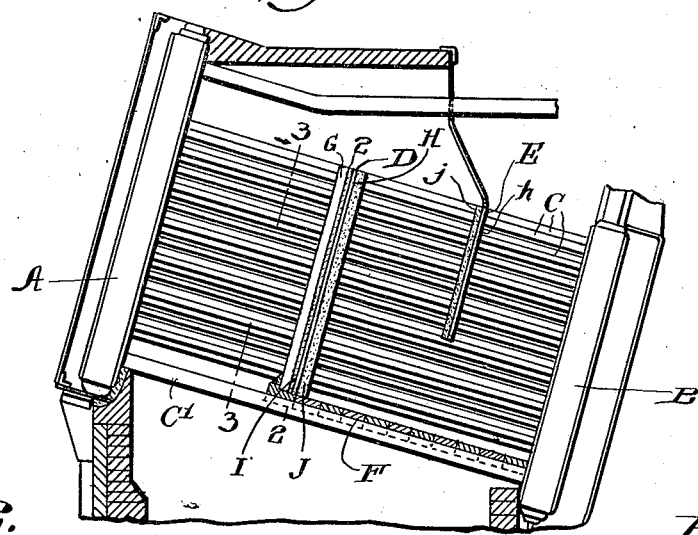
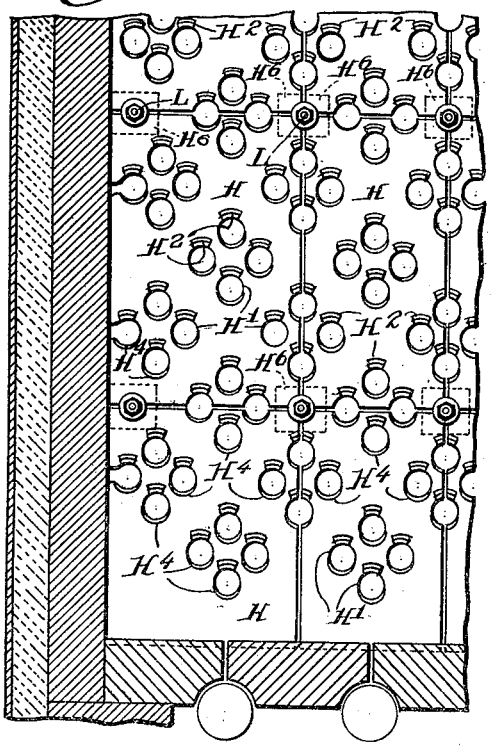
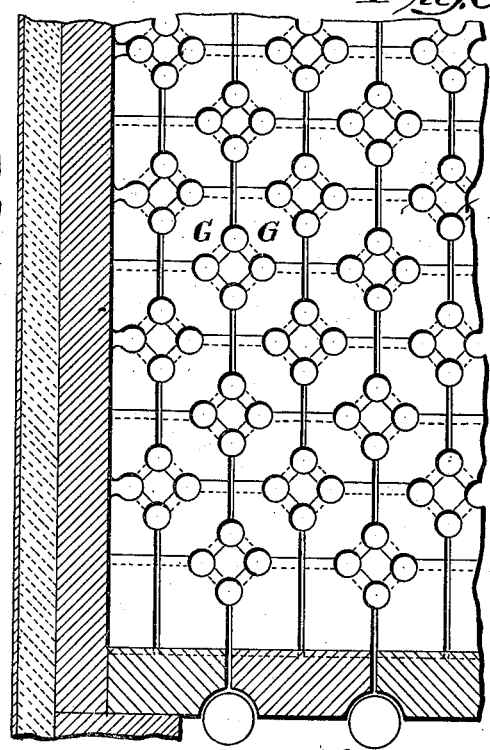

UNITED STATES PATENT OFFICE.

WILLIAM F. SELLERS, OF WILMINGTON, DELAWARE, ASSIGNOR TO EDGE MOOR IRON COMPANY, OF EDGEMOOR, DELAWARE, A CORPORATION OF DELAWARE.

METALLIC BAFFLE-PLATE.

1,351,797.   Specification of Letters Patent.   Patented Sept. 7, 1920.

Application filed October 11, 1918. Serial No. 257,731.

*To all whom it may concern:*

Be it known that I, WILLIAM F. SELLERS, a citizen of the United States of America, and a resident of Wilmington, Delaware, have invented certain new and useful Improvements in Metallic Baffle-Plates, of which the following is a true and exact description, reference being had to the accompanying drawings.

My present invention consists in an improved metallic baffle plate especially intended for use either alone, or in conjunction with a facing layer or layers of refractory material, as a baffle or deflector wall in a multi-pass water tube boiler furnace, though not necessarily restricted to such use. The general object of the invention is to provide an improved metallic plate construction for the use specified, and a particular object of the invention is to provide a plate for the purposes specified which will be in good heat conducting relation with the boiler tubes passing through the plate and by which the plate will ardinarily be wholly or partially supported. A second specific object of my invention is to so form the plates as to secure the desired conducting relation between the baffle plates and boiler tubes, as to facilitate the formation of the plates by casting them of iron, and to facilitate a desirable connection between the metal plates and refractory cement with which the plates may be faced.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred embodiment of my invention.

Of the drawings:

Figure 1 is a somewhat diagrammatic elevation, with parts broken away and in section, of a portion of a water tube boiler furnace in which my improved metallic baffle plates are employed.

Fig. 2 is a partial section on the line 2—2 of Fig. 1, with parts broken away and removed.

Fig. 3 is a partial section on the line 3—3 of Fig. 1, with parts broken away and removed.

Fig. 4 is a partial section taken at right angles to Figs. 2 and 3 and showing the formation of the junction between walls D and F as I prefer to construct them.

Fig. 5 is an elevation of one of the plates taken on a larger scale than Fig. 2.

Fig. 6 is a section on the line 6—6 of Fig. 5; and

Fig. 7 is an elevation of portions of two connected plate sections.

In Fig. 1 I have illustrated the use of my invention in connection with a well known type of boiler furnace construction, in which the water tube boiler shown comprises front and rear headers A and B respectively, which are connected by a row of water tubes C' of larger size than the water tubes C. The inter tube space is divided into three passes by a main transverse baffle or deflector wall D, extending across and traversed by all of the water tubes C, a baffle or deflector wall E traversed by the water tubes C forming the upper half of the bank of these tubes, and a baffle wall F resting on the bottom row of water tubes C'.

The baffle wall D (see Fig. 4) is formed of a metallic reinforcing portion formed of plate sections H, a layer of refractory material J, such as hot blast cement, plastered on the rear sides of the metallic plates H; a thin layer I, of material which may be similar to that of the layer J, plastered on the front face of the metallic plates H, and a facing forming the front sides of the wall composed of tile G. The tile G are preferably formed, as shown, with overlapping edge surfaces so arranged that each tile other than the lower marginal tile of the wall is prevented by adjacent tiles from movement along the water tubes in a direction parallel to the length of the latter away from the plates H under the vibration produced tendency to such movement experienced in the operation of such boilers. This special tile construction of itself forms no part of my present invention, but is the invention of Harry B. Bradford, and is disclosed and claimed in his application Serial No. 186,684, filed August 17, 1917. As shown in Fig. 4, the bottom edge of the wall D enters a recess formed in the upper side of the baffle wall F, which is made of suitably shaped tile or brick, in a known manner.

The metallic plates H are preferably rectangular in outline, as shown in Figs. 2 and 5, and are each of a convenient size for manufacture and assembly. The various plates H, forming a part of a single baffle wall, meet edge to edge, and each plate is perforated as required to receive the boiler tubes C, which may be arranged in any usual or preferred manner. As shown in the drawings, most of the boiler tube openings H' of the plates lie wholly within the margins of the various plates, but some of these openings are arranged along the meeting margins of adjacent plates and are formed by registering semi-cylindrical notches in the adjacent edges of adjacent plates. At the upper side of the opening H' in each plate, an integral lug $H^2$ is formed which projects away from one face of the plate. Each lug has its side adjacent the opening H' concave and shaped to fit snugly against the upper side of the water tube C passing through the corresponding plate opening H'. The opposite side of the lug is tapered, thus making it possible to form the plates out of iron by casting, with the surface elements of the concave sides of the projections $H^2$ extending perpendicular to the adjacent face of the plate as is desirable to insure the desired extensive contact between the plate and the water tubes traversing the plate when, as is usually the case, the tubes extend at right angles to the plane of the plates. To facilitate the plate casting operation, and also the assemblage of the plates in the boiler furnace, the openings H' are preferably tapered as indicated at $H^4$ below the side edges of the lugs $H^2$.

The different plates H in a single wall should be rigidly connected together, and for this purpose I preferably form some of the plates with lugs $H^6$, which overlap the edges of the adjacent plates at the opposite side of the wall to that on which the lugs $H^2$ project, and I provide clamping bolts L for securing the plates together. As shown in Figs. 2, 5 and 7, each corner of a plate H remote from the margin of the baffle wall, is formed with a notch $H^5$ indicated as a curved notch. The notches $H^5$ of the four plates meeting at a corner of each unite to form an opening for the body of a clamping bolt L, which passes through this notch and through similar notches formed in the overlapping lugs $H^6$ carried by two of the four plates meeting at the corner. As shown in Fig. 2, each upper and lower pair of plates H at the side edge of the wall D are connected by a bolt L, which in this case, passes through the openings formed by the indicated notches in the upper and lower plates, and through an opening formed in the lug $H^6$ formed on the upper plate of the two thus connected. The heads of, and the nuts on the bolts L, are embedded in the refractory material layers I and J, and the lugs $H^2$ are embedded in the layer I.

The baffle wall E is formed of a metallic portion composed of plates $h$ similar to those employed in the baffle wall D. The lugs $H^2$ face toward the front end of the boiler, and are embedded in the layer of hot blast cement $j$ plastered on the front side of the metallic plate section $h$, which, with the refractory material $j$, constitutes the wall. The rear sides of the plate $h$ are not faced with refractory material in wall E.

With the construction described, each water tube C, and the metal plate H through which the water tube passes have large and effective heat conducting contact surfaces by reason of the engagement of the concave side of the corresponding lug $H^2$ with the water tube. This insures a sufficiently rapid abstraction of heat from the baffle plates H by the water tubes C to prevent the plates from being injuriously overheated under normal conditions of operation. The special shape given to the lugs $H^2$ permits the easy and accurate formation of the plates and lugs by a casting operation. The lugs $H^2$ are also of advantage when the plates are faced with refractory material plastered on the corresponding sides of the plates, as these lugs assist in holding the plaster layer in place against the faces of the metal plates. It will be understood, however, that the metal plates H may sometimes be used as deflector walls without facing either of the sides of the plates with refractory material.

While in accordance with the provisions of the statutes I have illustrated and described the best form of the invention now known to me, it will be apparent that changes may be made in the form of the apparatus disclosed, and particularly in the shape given the metal plates, without departing from the spirit of my invention as set forth in the appended claims.

Having now described my invention, what I claim as new and desire to secure by Letters Patent, is:

1. As a new article of manufacture a cast metallic plate for use in a baffle wall traversed by the water tubes of a water tube boiler, said plate being formed with openings for the water tubes and with lugs projecting from the plate along the upper portion only of the margin of each boiler tube opening, each lug having a concave side adapted to fit against the top of a boiler tube passing through the corresponding tube opening.

2. As a new article of manufacture a cast metallic plate for use in a baffle wall traversed by the water tubes of a water tube boiler, said plate being formed with openings for the water tubes and with lugs projecting from one side of the plate along the upper portion only of the margin of each boiler tube opening, each lug having a concave side shaped to fit against the top of a boiler tube passing through the corresponding tube opening and a tapered outer side.

3. As a new article of manufacture a cast metallic plate for use in a baffle wall traversed by the water tubes of a water tube boiler, said plate being formed with lugs projecting from one side of the plate along the upper side only of the margin of each boiler tube opening, said lugs being formed with concave lower sides to fit the tops of the tubes and with tapered upper sides, and said plates being also formed with boiler tube openings which below the lugs have walls flaring in the direction of the lugs.

WM. F. SELLERS.